United States Patent

Lai et al.

[11] Patent Number: 6,037,292
[45] Date of Patent: Mar. 14, 2000

[54] COMPOSITIONS HAVING TWO OR MORE ZEOLITE LAYERS

[75] Inventors: Wenyih F. Lai, Bridgewater, N.J.; Edward William Corcoran, Jr., Easton, Pa.

[73] Assignee: Exxon Research and Engineering Co., Florham Park, N.J.

[21] Appl. No.: 09/109,603

[22] Filed: Jul. 2, 1998

[51] Int. Cl.⁷ .............................. B01J 29/04; B01J 29/06; B01J 21/00; B01J 20/28

[52] U.S. Cl. ................................ 502/60; 502/64; 502/66; 502/71; 502/77; 502/4; 502/71.7

[58] Field of Search ............................ 502/60, 64, 66, 502/71, 77, 4, 71.7

[56] References Cited

U.S. PATENT DOCUMENTS

| | | |
|---|---|---|
| 5,019,263 | 5/1991 | Haag et al. ......................... 210/500.25 |
| 5,464,798 | 11/1995 | Jia et al. ...................................... 502/64 |
| 5,554,286 | 9/1996 | Okamoto et al. ................... 210/500.25 |
| 5,716,527 | 2/1998 | Deckman et al. ....................... 210/651 |
| 5,723,397 | 3/1998 | Verdijn ........................................ 502/4 |
| 5,744,035 | 4/1998 | Geus et al. .............................. 210/490 |
| 5,763,347 | 7/1998 | Lai ............................................... 502/4 |

*Primary Examiner*—Gary P. Straub
*Assistant Examiner*—Cam N. Nguyen
*Attorney, Agent, or Firm*—Gerrard J. Hughes; Linda M. Scuorzo

[57] ABSTRACT

The present invention is directed towards compositions of two or more zeolite layers. The compositions of the invention include zeolite compositions that are themselves catalytic as well as zeolite compositions used in combination with non-zeolite catalytic materials. The compositions may include a porous support.

8 Claims, 10 Drawing Sheets

(A)

(B)

(A)

Zeolite layers

Substrate (B)

ZSM-5 layer

Silicalite layer

Nucleation layer + Substrate (A)

(B)

(A)

Zeolite layers

Nucleation layer + Substrate (B)

ZSM-5 layer

Nucleation layer

Silicalite layer

Nucleation layer + Substrate

ZSM-5 layer, 180C/3hrs silicate layer, 180C/2hrs nucleation layer + substrate magnified image of silicalite layer,
indicating defect within this layer

COMPOSITIONS HAVING TWO OR MORE ZEOLITE LAYERS

FIELD OF THE INVENTION

The present invention is directed towards compositions having two or more independently selected zeolite layers. The invention includes catalytic zeolite compositions and catalytic or non-catalytic zeolite compositions used in combination with non-zeolite catalytic materials. The compositions may include a support.

BACKGROUND OF THE INVENTION

Molecular sieve membranes such as zeolite membranes have been proposed for uses such as molecular separations, reactions, and combined separations and reactions. Such membranes comprise a zeolite layer, or other inorganic layer capable of molecular separations, on porous or solid substrates. The membranes may also include optional growth enhancing layers, seed layers, and reparation layers. Additionally, the zeolite layer may have a catalytic functionality present in the layer itself, in some cases inherently, or in the form of a proximately-located catalytically active material.

However, some separation, reaction, or combined separation/reaction processes cannot be performed with zeolite membranes known in the art. Some examples of such processes include cases where the catalytic functionality is in the form of catalyst distributed, sometimes with a binder, on or in to one or more layers of the membrane. Unfortunately, such membranes would be subject to catalyst attrition. Binder contamination is also a problem, especially in cases where the binder is itself catalytic.

Zeolite compositions capable of combined separation and reaction are known in the art. One example of such a composition uses conventional catalyst particles on or near the separation layer so that specific products and reactants can be selectively added or removed from the reaction zone. In other examples of such compositions, the catalytic functionality, which may be in the form of catalyst particles, is located within the zeolite layer.

It is desirable to apply compositions combining reaction and separation functionalities to processes involving staged separations. In staged separations, one or more reactants are separated from a reactant source by a zeolite or zeolite-like layer. One or more additional layers may be used to further separate the reactants, reactants and products, or products formed in or between the layers. Monolithic structures containing two or more zeolite layers in combination with catalytic functionality and capable of staged separation are not known in the art. Obstacles to forming such compositions include materials-based incompatibilities between the individual layers and between layers and particulate or layer-based catalytic functionality.

Therefore, there remains a need for membrane compositions having two or more zeolite layers and capable of separations, reactions, and combined reaction and separation wherein the catalytic functionality is either an integral part of the membrane or chemically bound to the membrane, especially when the catalytic functionality is in the form of a membrane. In particular, there is a need for a monolithic composition capable of separation, reaction, and combined reaction and separation having at least two zeolite layers in contact, the layers being composed of independently selected zeolite.

SUMMARY OF THE INVENTION

In one embodiment, the invention is a composition comprising:

a first dense, columnar, polycrystalline layer of zeolite or zeolite-like crystals and a second independently selected dense, columnar, polycrystalline layer of zeolite or zeolite-like crystals, the second layer having a surface in contact with the first layer, the first and second layers having pore openings.

DETAILED DESCRIPTION OF THE INVENTION

Figure 1:
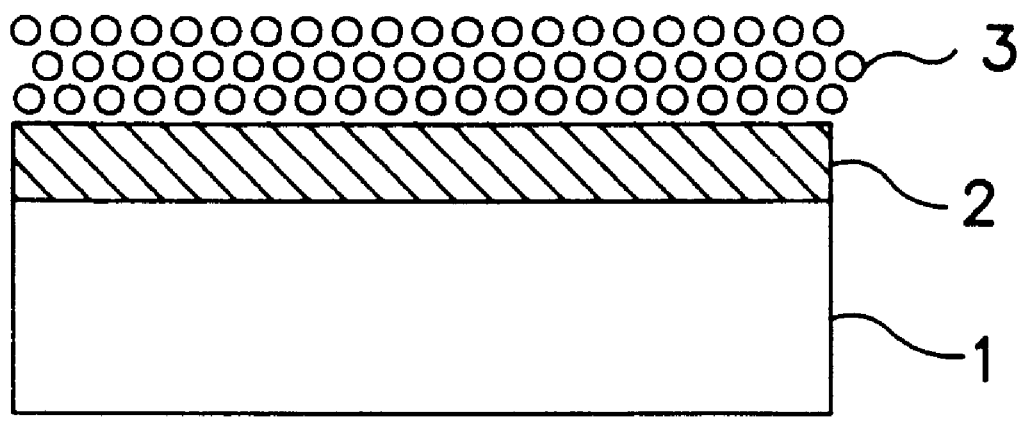
FIG. 1 shows an embodiment where the catalytic functionality (3) is in contact with a zeolite separation layer (2) that is in contact with a support (1).

The invention is based on the discovery that monolithic compositions can be formed having a first zeolite layer in contact with a second zeolite layer.

In one embodiment, the invention is a monolithic zeolite membrane composite capable of separation, reaction, and combined reaction and separation comprising at least two independently selected zeolite layers. Process applications in which the invention can be used include separations of molecular species, catalytic reactions and reactions which combine reaction and separation. The composition may contain a porous substrate in contact with one of the zeolite layers or a permeable intermediate layer situated between the support and one of the zeolite layers. Intermediate layers may also be situated between the zeolite layers. The invention is compatible with reparation and selectivity-enhancing coatings on the zeolite layers.

Advantageously, the zeolite layers included in the compositions of the invention are formed from crystals that are contiguous, i.e., substantially every crystal is in contact with one or more of its neighbors. Such contact may be such that neighboring crystals are intergrown, provided they retain their identity as individual crystals. In a preferred embodiment, the crystals in the layer are closely packed.

It is preferred that the layer's crystals are intergrown in the zeolite layer so that nonselective permeation paths through the layer are blocked by the narrowest point of approach between crystals. Non-selective permeation pathways are taken to be permeation pathways which exist at room temperature that do not pass through the zeolite crystals. This blockage of nonselective permeation pathways can exist at room temperature after a template which occludes the pore structure is removed from the zeolite crystals. Templates used to aid in the crystallization of zeolites may be removed by a calcination step; intergrown zeolite crystals (within a layer) should exhibit a blockage of nonselective permeation pathways after the template is removed. A preferred dense zeolite layer is formed such that there exists at least one point on a crystal that is less than 20 Å from a point on an adjacent crystal. Between these points can be inorganic oxide material that restricts nonselective permeation of molecules through the layer. The spacing between zeolite crystals in this dense intergrown zeolite layer can be established by TEM or with dye permeation tests.

The absence of nonselective permeation paths can be detected by methods known in the art and set forth in U.S. Pat. No. 5,716,527 and U.S. Pat. No. 5,763,347, incorporated by reference herein.

The zeolite crystals forming the zeolite or zeolite-like layers of the invention are as set forth in the referenced patents, as are the layers' structure, spatial and crystallographic orientation, and defect and void concentration. Such properties may be individually selected in each layer of the invention.

Monolithic compositions of the present invention may include a support material in contact with one or more of the zeolite layers. The support may be porous or non-porous. Supports useful in the invention and their properties are set forth in the referenced patents. Mesoporous and microporous intermediate layers may be present in the invention between a zeolite layer and a support, between zeolite layers, and between zeolite and non-zeolite layers. Such intermediate layers are known in the art, and are set forth in the referenced patents. GEL and seed layers are both useful in the invention.

The thickness of the zeolite layers is within the range 0.1 to 150 μm, preferably from 0.5 to 20 μm. The thickness of each layer is independently selected.

Figure 9:
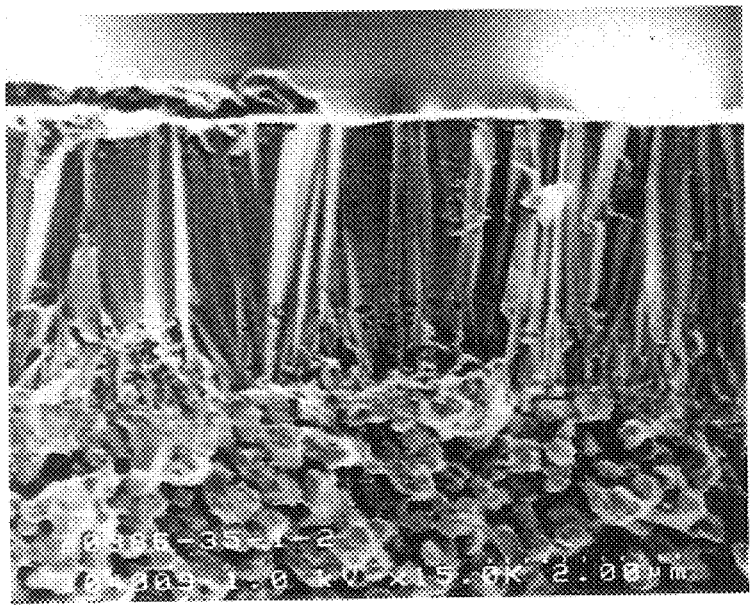
FIG. 9 shows a ZSM-5 layer grown on a calcined silicalite layer. Two magnifications are shown.
Figure 9:
Figure 9:
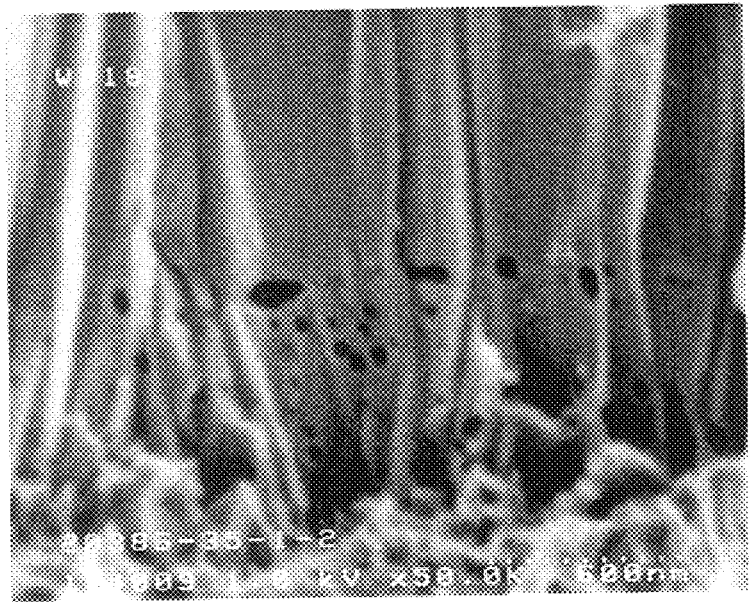

The zeolite or zeolite-like layers of the invention may be hydrothermally formed by contacting the substrate, GEL, or seed layer with a zeolite synthesis mixture, and heating for a time and at the temperature sufficient to effect crystallization. Contacting as used herein includes total and partial immersion. Heating times may be, for example, in the range of from 1 hour to 10 days, preferably from 24 hours to 4 days. Temperatures may be, for example, from 50 to 300° C., preferably from 90 to 200° C. When a GEL or seed layer is used, the contacting of the substrate with GEL or seed layer must be carried out such that there is no settling of crystals formed in the synthesis mixture during hydrothermal treatment onto the GEL or seed layer. When a true zeolite material is formed, the synthesis mixture contains a source of silica; optimally a structure directing agent, and a source of any other component desired in the resulting zeolite. It may also contain nanocrystalline zeolites or seed crystals. Synthesis mixtures from which zeolite crystals are grown are well known in the art (see e.g., *Handbook of Molecular Sieves*, Rosemarie Szostak, Van Nostrand Reinhold, N.Y. 1992). A preferred route for MFI zeolites, e.g., is from a Low Alkaline synthesis mixture having a pH of about 6 to about 13 preferably about 8 to about 13, and from which MFI zeolite crystals can be grown. Such mixtures are readily prepared by those skilled in the art. For example, suitable mixtures include $Na_2O$, TPABr ("tetrapropylammoniumbromide), $SiO_2$ and water. The compositions are grown by contacting the GEL coated substrate in the low alkaline synthesis mixture. The synthesis mixture is then heated to about 50 to about 300° C., preferably about 180° C., for a period of about 30 minutes to about 300 hours, preferably for about 30 minutes. After crystallization, the supported layer may be washed in hot water for a time sufficient to remove un-reacted synthesis material, dried, and calcined by methods known in the art. Hydrothermal growth of a second layer on top of a calcined zeolite layer may result in the erosion (or corrosion) of the calcined layer. It is believed that this erosion results from interactions between the calcined layer and the synthesis solution. See FIG. 9. When a second layer is grown on a zeolite layer that has not been calcined, no erosion is observed. See FIG. 10. It is believed that the template material such as tetrapropylammonium bromide protects the underlying layer during synthesis of the second layer. Such templates decompose during calcination and would consequently offer no protection to a calcined layer.

As set forth in the referenced patents, zeolite layer synthesis solutions contain colloidal-sized silica precursors ranging in size from below about 0.1 micrometer. When support pore sizes range larger than the silica precursor size, then support invasion by the synthesis solution may occur, and the hydrothermally formed zeolite layer may partially or entirely fill the substrate's pores.

A preferred synthesis technique used with this invention is the growth of zeolite crystals on the face of a zeolite or zeolite-like layer, a support, or intermediate layer which is oriented from 90 to 270 degrees in a synthesis mixture, as set forth in the referenced patents.

The compositions of the invention are selective molecular separators. Such compositions, as set forth herein are useful for all separations, reactions, and combined reactions and separations set forth herein and in the referenced patents.

Figure 2:
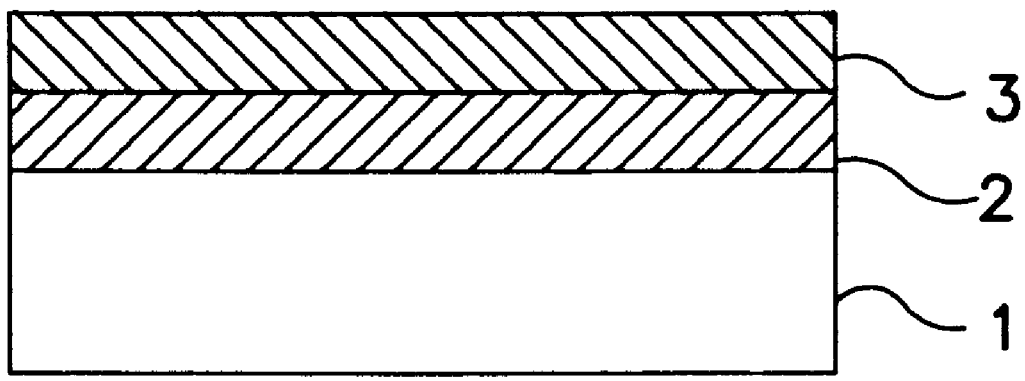
FIG. 2 shows an embodiment wherein the catalytic functionality is in the form of a zeolite or zeolite-like layer (3) intergrown with a zeolite separation layer (2), the separation layer being in contact with a support (1).
Figure 3:
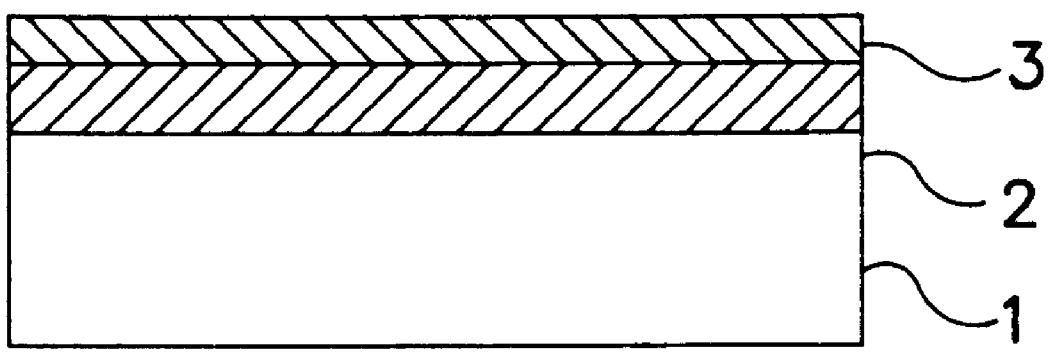
FIG. 3 shows a catalytic functionality (3) incorporated into a region of a separation layer (2) in contact with a support (1).

Depending on the nature of the desired process, i.e. whether it involves reactions, separations, or a combination of separations and reactions, the composition may be in the form of a composite. The composites shown in FIGS. 1 through 3 are illustrative of the invention, and are not meant to be limiting. Combinations of two or more of the composites are within the scope of the invention. The illustrated composites have zeolite layers in contact with other zeolite layers, non-zeolite layers, and supports, but compositions having intermediate layers situated therebetween as set forth in the referenced patents are also within the scope of the invention. Such intermediate layers are also set forth in PCT publication WO 96/01687, incorporated by reference herein. The illustrated composites are shown for simplicity in planar form, i.e. as layers having a small thickness compared to surface area. Concentric tubular composites are also within the scope of the invention, and such composites may be in monolithic or honey-comb form. A zeolite layer, non-zeolite layer, or substrate may be the innermost, inner, or outermost concentric layer of the tube or monolith.

FIG. 1 shows an embodiment where the catalytic functionality is in contact with a zeolite separation layer that is in contact with a support. This embodiment is useful in processes in which it is desirable for separation and catalysis to occur on the same side of the support.

FIG. 2 shows an embodiment wherein the catalytic functionality is in the form of a zeolite or zeolite-like layer intergrown with a zeolite separation layer, the separation layer being in contact with a support. The catalyst layer may be epitaxial with the separation layer. Both zeolite layers may be formed in accordance with the synthesis methods set forth herein, although it may be desirable for the catalytic layer to have a large number of grain boundaries and defects in order to increase catalyst surface area. In a related embodiment not illustrated, the catalyst layer is slip coated or cast according to methods known in the art and the affixed to the separation layer. In another related embodiment, the catalytic functionality is incorporated into a region of the separation layer, as set forth in FIG. 3. Advantageously, the composition may be formed in a single growth reaction with the addition of the catalytic functionality or its precursor occurring near the end of the synthesis in order to incorporate the catalytic functionality into the outermost zone of the separation layer. This growth may take the form of secondary growth (i.e. multiple in situ hydrothermal syntheses, with or without seeding), post-synthetic treatment (e.g. treatment with an Al—O source to incorporate acidic Al—O—H into the system), or introduction of an alumina source into the primary reaction mixture after a specific period of time resulting in a zeolite layer with a varying Si/Al composition in different zones. The embodiment of FIG. 3 is advantageous in processes where close proximity is desirable between the catalytic and separation functionalities and where it is desirable for the catalytic layer to reparate the separation layer.

Zeolite compositions of the invention may be utilized to conduct a wide variety of separations based on their molecular sieving capabilities. Their performance is largely determined by their framework geometry (pore structure) and framework composition. Additionally, their separations behavior may be influenced by extra-framework, charge-balancing cations, which may reduce access to, or mobility through their internal pore network. Thus, diffusivity of a molecular species through a zeolite pore system (for components which are not restricted from entering the pore because of a prohibitively large kinetic diameter) may be restricted by cations residing within the channel and influenced by interactions with the atoms encountered at the channel surface.

Figure 4:
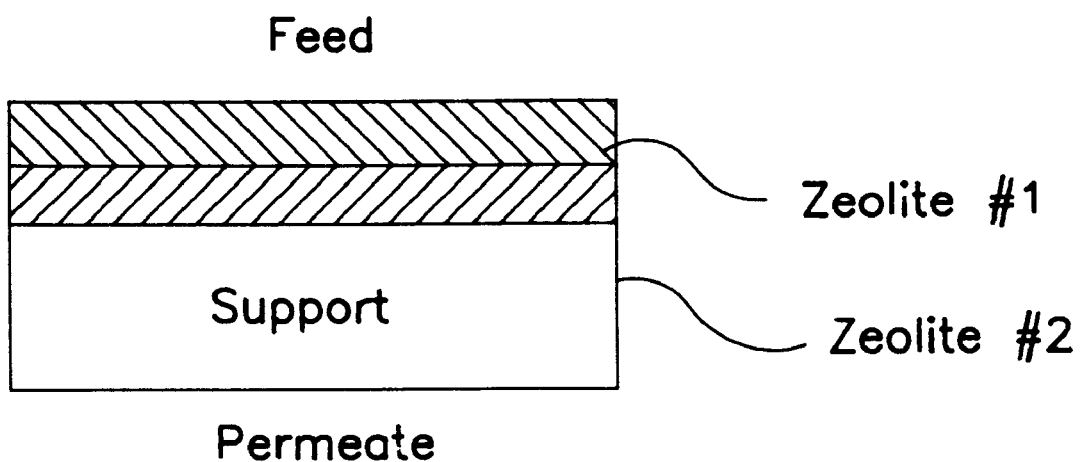
FIG. 4 shows the use of a zeolite membrane in a separation process.

It may be desirable to separate a mixture of components utilizing these two phenomena (size exclusion (pore restriction) and surface interaction) in various combinations. For the case of two distinct zeolite layers on a membrane support, see FIG. 4, there exist four possible architectures: (i) where zeolites 1 and 2 are both separating molecules based on size; (ii) where zeolites 1 and 2 are both separating based on interactions of molecules at their pore surfaces; or (iii and iv) where each separation phenomenon singly dominates in one of the two zeolite layers.

Processes involving acid- and/or metal-catalyzed reactions are within the scope of the invention. The properties exhibited by a specific material may depend on (i) the framework structure and composition of the zeolite; (ii) both the framework and non-framework (i.e. detrital) atoms of the material; (iii) inherent or exchanged cations; (iv) metals impregnated into the material (typically post-synthesis); (v) any other post-synthetic treatment such as selectivation, coking, or silanation.

Figure 5:
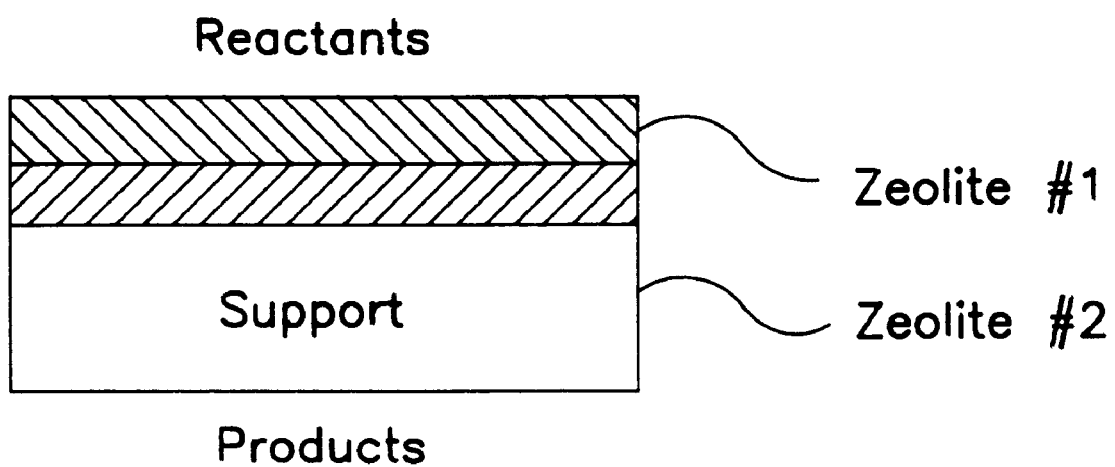
FIG. 5 shows the use of a zeolite membrane in a process combining reaction and separation.

It may be desirable to conduct two reactions simultaneously, or successively, in a single system utilizing a single reaction mixture, or two different, separated mixtures. In the first case, simultaneous or successive reactions (for example, acid-catalyzed, metal-catalyzed, or both) could be affected by the use of multiple layers of supported zeolite catalysts as in FIG. 5.

As set forth herein, multiple layers of zeolites can also be utilized to combine reaction and separation within a single system. Benefits accruing from the use of the invention's compositions in such processes include selectivity enhancement of a catalytic reaction, strict control of reaction stoichiometry, reaction rate enhancement, limiting which reactants 'see' the catalyst, and protection of a catalyst from deactivation by contaminants in the reaction mixture. Multiple layers can also be used on either side of a support to separate components from two different reaction mixtures so that a limited number reactants react at catalytic sites within a support.

A particularly advantageous use of the compositions of the invention involves producing species in concentrations above equilibrium in equilibrium-limited catalytic reactions, especially in equilibrium limited isomerization reactions of xylenes isomers. The use of the compositions of the present invention in such a process is set forth in more detail below.

Maintaining a constant feed of equilibrium xylene isomers is critical to the success of a zeolite membrane separation system for enhancing production of para-xylene because the feed is quickly depleted of para-xylene by the membrane. In the practice of this invention, this is accomplished by combining an isomerization catalyst with the permselective membrane transport system.

Such an isomerization catalyst may be one of the known aromatic isomerization catalysts, including acidic materials such as ZSM-5 and precious metal catalysts. The catalytic functionality should be properly positioned within the reactor membrane system relative to the separation layer. It is advantageous to keep the catalyst in very close proximity to the separation functionality of the membrane system so that a constant source of para-xylene is available to the membrane (i.e. the catalyst quickly re-equilibrates the remaining xylene isomers to maintain a source of para-xylene). Separating the two components by a significant distance may require back diffusion by the para-depleted feed to re-establish equilibrium, thus lowering the overall efficiency of the system.

Several other criteria, in addition to catalyst placement and selection, have a bearing on combining the catalytic and separation functionalities. The effective reactivity of the catalytic component should be sufficient to constantly maintain isomer equilibrium; i.e. catalytic reactivity must be greater than the rate of para-xylene removal. The reactivity is controlled by several factors including (using an acid catalyst such as ZSM-5 as an example): (i) process conditions; (ii) framework silica/alumina ratio, which generally determines the acidity, and therefore, the activity of the catalyst; and (iii) the amount of catalyst, or more specifically, catalyst surface area, available for reaction.

The framework composition of the acidic zeolite is largely determined by the hydrothermal reaction conditions established for the crystallization of the material as set forth herein and in the referenced patents. In the absence of any alumina source, the MFI structure resulting from a tetrapropylammonium cation-directed synthesis is completely devoid of any framework aluminum (silicalite-1) and, consequently, any catalytic activity. This structure is ideal, however, for separation of para-xylene from its isomers because it is incapable of converting para-xylene back into an equilibrium mixture (its pore size is also suitable for this molecular separation). However, the presence of alumina and, depending on hydrothermal reaction conditions, aluminum incorporation into the framework, provides a source of Brönsted acidity necessary for catalytic isomerization.

Catalyst volume, surface area, regeneration, and replacement considerations also have a bearing on the use of the compositions of the invention in para-xylene production. For loose catalyst particles, a volume of sufficient size to contain the amount of catalyst required (to maintain xylenes equilibrium for the membrane) is necessary. Care must be taken when positioning loose particles in direct contact with the thin zeolite separation layer in order to avoid abrasion. Regarding catalyst regeneration and replacement, important criteria include the choice of feed/sweep flow (counter- vs. co-current), hydrogen requirements, heat effects, and the need for cross-cut channels to improve overall system flow.

Regardless of whether an integrated catalyst architecture or a loose catalyst is chosen, the catalytic functionality should be present in a sufficient amount to establish thermodynamic equilibrium and should minimally limit the overall mass transfer of the system. Consequently, continuous defect-free ZSM-5 overlayers are not desirable because of the xylene transport limits in this material.

EXAMPLES

Some aspects of the invention are set forth in the following non-limiting examples.

Colloidal silicalite and ZSM-5 solutions prepared in accordance with the referenced patents were used for the preparation of the nucleation layer coating. The hydrothermal processes were performed using mixtures of the following reagents: NaOH, Ludox HS-40™ (Dupont), tetrapropylammonium bromide (98%), Al(NO3)3.9H2O and distilled water.

Thin silicalite membranes having a porous alumina substrate having about a 0.1 micron pore size, a thin nucleation layer(<1 micron), and a silicalite layer (0.5 micron) were prepared. Thick silicalite membranes were synthesized at 180° C. for 6 and 21 hours on seeded theta-alumina porous alumina of about 0.1 and 1.0 pore size substrate. Both thick and thin membranes were washed in hot water for a time sufficient to remove any un-reacted synthesis material.

Example 1

Preparation of Epitaxial ZSM-5 on a Silicalite Membrane

In a hydrothermal reaction, the ZSM-5 layer was prepared from reaction mixtures of NaOH, TPABr, colloidal silica, Al(NO3)3.9H2O, and water. The chemical composition of the synthesis solution was 5 Na2O:100 SiO2:8000 H2O: 2 Al2O3: 10 TPABr. The 6.4 g of TPABr, 0.94 g of Al(NO3)3.9H2O, and 2.05 g of NaOH (50 wt. %) were dissolved in 300 ml of distilled water with stirring. To this solution, 37.6 g of Ludox HS-40 was then added with agitation for at least 15 minutes until a uniform solution was formed.

Thick supported silicalite membranes as set forth above were placed in the upper position of a Teflon liner and supported with the stainless steel wire mesh in an inverted orientation. The synthesis solution was then poured into reactor to cover the entire carriers. The autoclave was sealed and placed in an oven, which was preheated to the desired temperature. The reaction time can vary from one hour to several weeks depending on the desired thickness. The reaction bombs were removed from the oven after reaction and cooled to room temperature. The coated membranes were washed with hot water for at least 6 hours, then calcined at 500° C. for 6 hours in air. The heating rate was controlled at 10 C./hour. The resulting membranes were ion exchanged with 0.1N NH4NO3 solution at 80 C. for 2 hours, washed with water, dried at 120 C., then calcined at 500 C. for 6 hours.

Example 2

Preparation of Seeded ZSM-5 on a Silicalite Membrane (a) ZSM-5 nucleation layer coating:

The colloidal ZSM-5 was first diluted with distilled water to the concentration of 0.5 wt %. Silicalite membranes as set forth in example 1 were coated with this solution and calcined at 400 C. for 6 hours. The heating rate was controlled at 20 C./hr.

(b) ZSM-5 hydrothermal reaction:

A ZSM-5 layer was formed by an in situ crystallization via a hydrothermal reaction. In the reaction, the ZSM-5 layers were prepared from reaction mixtures of NaOH, TPABr, colloidal silica, Al2O3, and water. The chemical composition of the synthesis solution was 5 Na2O:100 SiO2:8000 H2O: 2 Al2O3: 10 TPABr. The 6.4 g of TPABr, 0.94 g of Al(NO3)3.9H2O, and 2.05 g of NaOH (50 wt. %) were dissolved in 300 ml of distilled water with stirring. To this solution, 37.6 g of Ludox HS-40 was then added with agitation for at least 15 minutes until a uniform solution was formed.

Supported silicalite membranes as set forth in example 1 and coated with a nucleation coating were placed in the upper position of a Teflon liner and supported with the stainless steel wire mesh. The synthesis solution was then poured into reactor to cover the entire carriers. The autoclave was sealed and placed in an oven, which was preheated to the desired temperature. The reaction time can vary from one hour to several weeks depending on the desired thickness. The reaction bombs were removed from the oven after reaction and cooled to room temperature. The coated carriers were washed with hot water for at least 6 hours, then calcined at 500° C. for 6 hours in air. The heating rate was controlled at 15 C./hour. The resulting membranes were ion exchanged with 0.1N NH4NO3 solution at 80 C. for 2 hours, washed with water, dried at 120 C., then calcined at 500 C. for 6 hours.

Example 3

Preparation of MFI Layer on a ZSM-5 Composite Membrane (a) ZSM-5/Colloidal alumina layer coating:

A coating slurry was prepared from the mixture of ZSM-5 fine powder with Si/Al=24.6 by weight, colloidal alumina (Al-20 from PQ), organic binder (methylcellulose), surfactant, and distilled water. The weight % of ZSM-5:alumina is controlled to 60:40 in this example. Application of the slurry to the substrate can be done by any convenient technique such as spinning, dipping, spraying, or casting, depending on size and geometry of the substrate. Here, a porous alumina substrate having about a 1 micron pore size was coated with the prepared slurry by spin coating, dried at 120 C., and calcined at 500 C. for 6 hours. The heating rate was controlled at 20 C./hr.

(b) ZSM-5 hydrothermal reaction:

A ZSM-5 layer was formed by in situ crystallization via a hydrothermal reaction. In the reaction, the ZSM-5 layer was prepared from a reaction mixtures of NaOH, TPABr, colloidal silica, Al2O3, and water. The chemical composition of the synthesis solution was 5 Na2O:100 SiO2:8000 H2O:2 Al2O3: 10 TPABr. The 6.4 g of TPABr, 0.94 g of Al(NO3)3.9H2O, and 2.05 g of NaOH (50 wt. %) were dissolved in 300 ml of distilled water with stirring. To this solution, 37.6 g of Ludox HS-40 was then added with agitation for at least 15 minutes until a uniform solution was formed.

Supports silicalite membranes as set forth in example 1 and coated with a nucleation coating were placed in the upper position of a Teflon liner and supported with the stainless steel wire mesh. The synthesis solution was then poured into reactor to cover the entire carriers. The autoclave was sealed and placed in an oven, which was preheated to the desired temperature. The reaction time can vary from one hour to several weeks depending on the desired thickness. The reaction bombs were removed from the oven after reaction and cooled to room temperature. The coated carriers were washed with hot water for at least 6 hours, then calcined at 500° C. for 6 hours in air. The heating rate was controlled at 15 C./hour. The resulting membranes were ion exchanged with 0.1N NH4NO3 solution at 80 C. for 2 hours, washed with water, dried at 120 C., then calcined at 500 C. for 6 hours.

Example 4

Preparation of ZSM-5 Composite Layer on a Silicalite Membrane

ZSM-5/Colloidal alumina layer coating:

A coating slurry was prepared from the mixture of ZSM-5 with Si/Al=24.6 by weight fine powder, colloidal alumina (Al-20 from PQ), organic binder (methylcellulose), surfactant, and distilled water. The weight % of ZSM-5:alumina is controlled to 60:40 in this study. Application of the slurry to the substrate can be done by any convenient technique such as spinning, dipping, spraying, or casting, depending on size and geometry of the substrate. Here, a supported silicalite substrate as set forth in example 1 was coated with the prepared slurry by spin coating, dried at 120 C., and calcined at 500 C. for 6 hours. The heating rate was controlled at 20 C./hr.

Example 5

Preparation of Seeded ZSM-5 on thin LAI-ISC Silicalite Membrane on SS or A Porous Alumina Substrate Having About a 1 Micron Pore Sizes (a) Preparation of thin LAI-ISC silicalite membrane on Stainless Steel or porous alumina substrates having about a 1 micron pore sizes The thin silicalite membranes were synthesized at 180 C. for 2 hours on a porous stainless steel or alumina support. The synthesis was conducted according to LAI-ISC synthesis methods as set forth in the referenced patents.

(b) ZSM-5 nucleation layer coating:

The colloidal ZSM-5 was first diluted with distilled water to the concentration of 0.5 wt %. Standard membranes were coated with this solution and calcined at 400 C. for 6 hours. The heating rate was controlled at 20 C./hr.

(c) ZSM-5 hydrothermal reaction:

The next step in the fabrication sequence is forming the ZSM-5 layer through in situ crystallization via hydrothermal reactions. In the reaction, the ZSM-5 layers were prepared from reaction mixtures of NaOH, TPABr, colloidal silica, Al2O3, and water. The chemical composition of the synthesis solution was 5 Na2O:100 SiO2:8000 H2O: 2 Al2O3: 10 TPABr. The 6.4 g of TPABr, 0.94 g of Al(NO3)3.9H2O, and 2.05 g of NaOH (50 wt. %) were dissolved in 300 ml of distilled water with stirring. To this solution, 37.6 g of Ludox HS-40 was then added with agitation for at least 15 minutes until a uniform solution was formed.

The silicalite membranes coated with a nucleation coating were placed in the upper position of a Teflon liner and supported with the stainless steel wire mesh. The synthesis solution was then poured into reactor to cover the entire carriers. The autoclave was sealed and placed in an oven, which was preheated to the desired temperature. The reaction time can vary from one hour to several weeks depending on the desired thickness. The reaction bombs were removed from the oven after reaction and cooled to room temperature. The coated carriers were washed with hot water for at least 6 hours, then calcined at 500° C. for 6 hours in air. The heating rate was controlled at 15 C./hour. The resulting membranes were ion exchanged with 0.1N NH4NO3 solution at 80 C. for 2 hours, washed with water, dried at 120 C., then calcined at 500 C. for 6 hours. The properties of samples synthesized in examples 1 through 5 are set forth in table 1.

TABLE 1

| Sample No. | substrate | reaction temp | reaction time | thickness | result |
|---|---|---|---|---|---|
| 1 | A | 180 C. | 24 hrs | 27 μm | Columnar ZSM-5 |
| 2 | A | 180 C. | 48 hrs | — | Columnar ZSM-5 |
| 3 | B | 180 C. | 18 hrs | ~14 μm | Columnar ZSM-5 |
| 4 | C | 180 C. | 18 hrs | ~14 μm | Columnar ZSM-5 |
| 5 | D | 120 C. | 24 hrs | ~1.5 μm | Columnar ZSM-5 |
| 6 | D | 120 C. | 42 hrs | — | Columnar ZSM-5 |
| 7 | D | 180 C. | 8 hrs | — | Columnar ZSM-5 |
| 8 | D | 180 C. | 24 hrs | ~27 μm | Columnar ZSM-5 |
| 9 | E | 180 C. | 3.3 hrs | — | Columnar ZSM-5 |
| 10 | E | 180 C. | 6 hrs | ~8 μm | Columnar ZSM-5 |
| 11 | E | 180 C. | 26 hrs | — | Columnar ZSM-5 |
| 12 | F | 180 C. | 12 hrs | — | Columnar ZSM-5 |
| 13 | G | 180 C. | 12 hrs | — | Columnar ZSM-5 |

Figure 6:
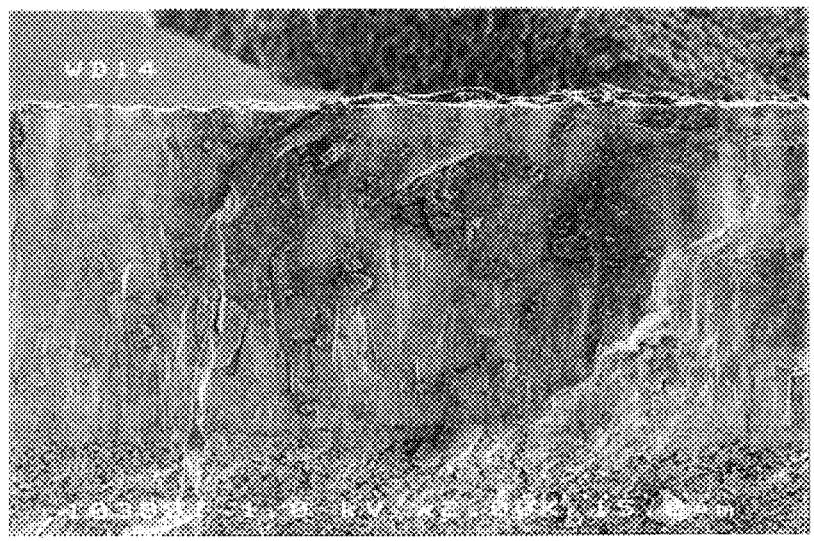
FIGS. 6, 7, and 8 are electron micrographs showing cross-sections of samples 1, 3, and 5, respectively, from table 1. Two magnifications are shown for each.
Figure 6:
Figure 7:
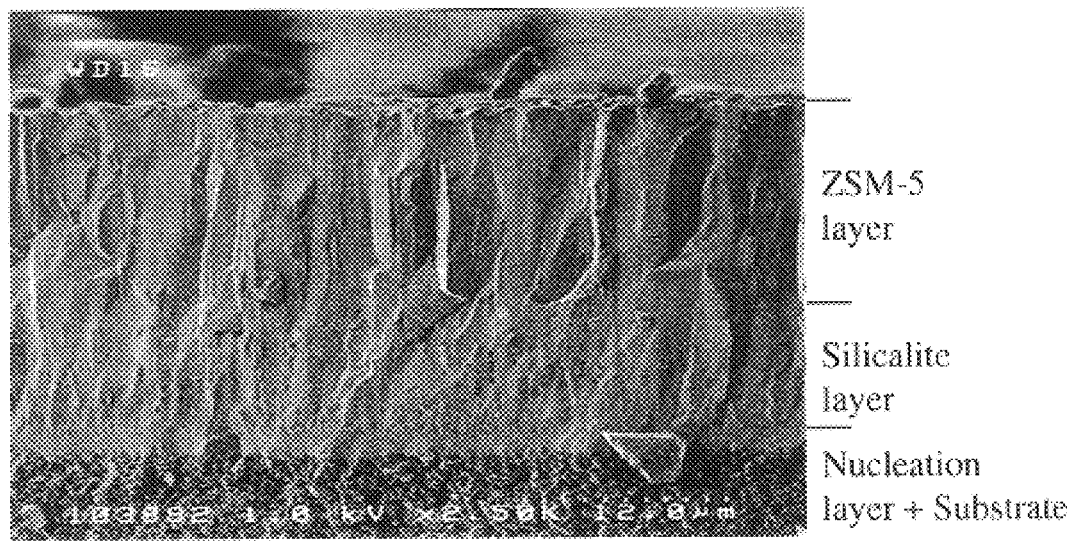
Figure 7:
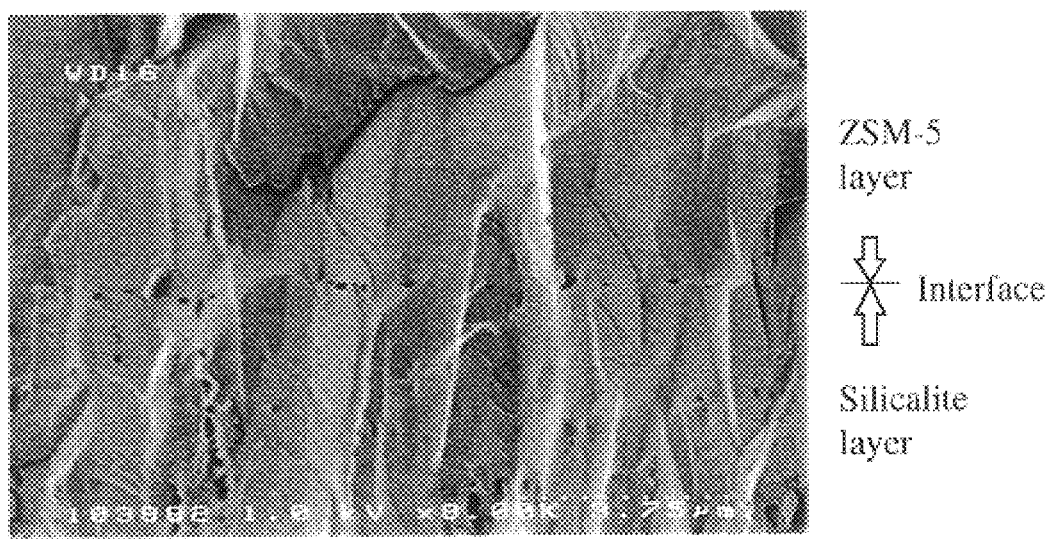
Figure 8:
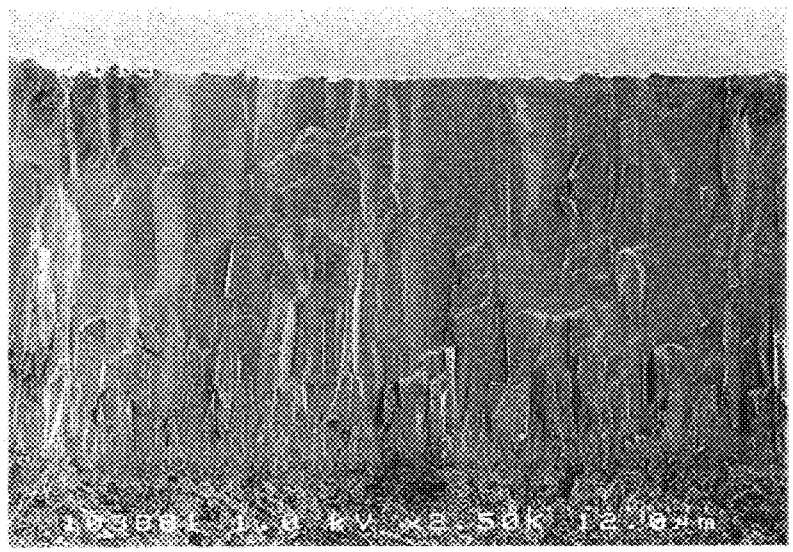
Figure 8:

Substrates: A: 0.5 μm silicalite membrane; B: 10 μm silicalite membrane; C: 30 μm silicalite membrane; D: seeded 0.5 μm silicalite membrane; E: ZSM-5 composite membrane (ZSM-5: alumina = 60:40 (wt.%)); F: seeded thin (<1–2 μm) LAI-ISC membrane on SS; G: seeded thin (<1–2 μm) LAI-ISC membrane on porous alumina having about 1.0 micron pore size.
"—" data is not available Detailed morphology of the resulting membranes were examined by SEM. FIGS. 6, 7, and 8 show the full cross-sectional morphologies of samples 1, 3, and 5. From the figures it is clear that ZSM-5 layers consist of a continuous array of densely packed and intergrown crystals. The formation of a columnar structure in the zeolite layer is apparent. The width of the columns right on the silicalite layer is very narrow and becomes larger and larger as the layer grows. As such, the average grain size of zeolite crystals increases with increasing film thickness.

From FIGS. 6 and 8, it can be seen that there is no morphology difference between the two membrane composites, it is believed that crystallization rate is about the same for samples with seeding or without seeding, 1 micron per hour at 180 C. The micrographs demonstrate that silicalite crystals on a silicalite layer can induce nucleation for ZSM-5 film formation. In other words, a silicalite membrane can be used as a nucleation layer for a regrown process. The evidence of epitaxial ZSM-5 grown on silicalite membrane can be observed more clearly on thick silicalite membrane, such as sample #5. Detailed epitaxial growth morphology from a silicalite membrane was shown in FIG. 7.

The SiO2/Al2O3 ratios of the ZSM-5 films were measured by EDX, and the SiO2/Al2O3 is estimated in between 40 to 100.

Example 6

Figure 10:
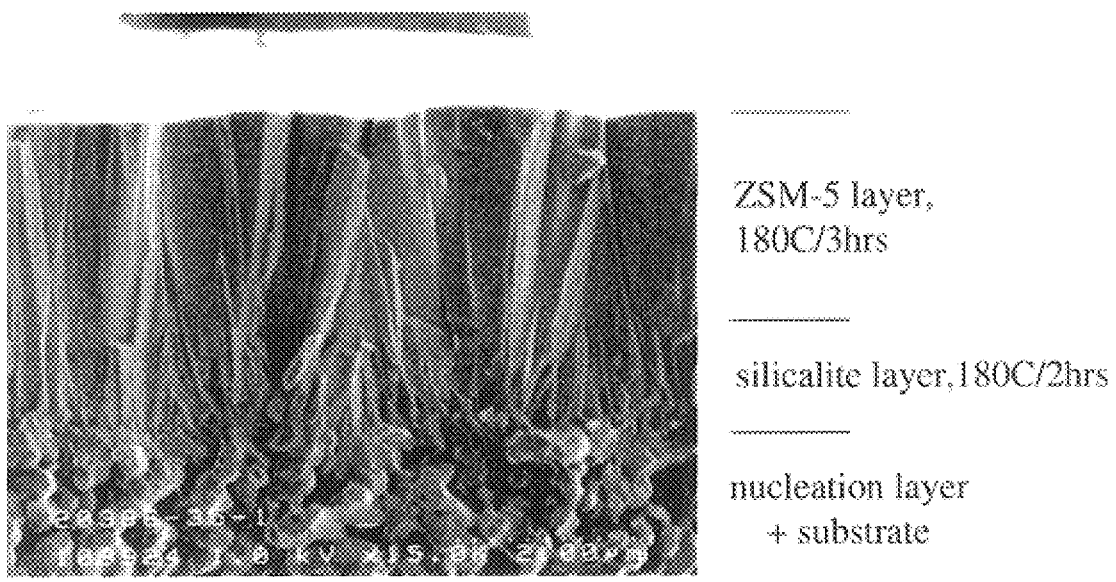
FIG. 10 shows a ZSM-5 layer grown on a silicalite layer where the silicalite layer has not been calcined.

A 0.1 porous alumina substrate was coated with a GEL layer and a 1 micron silicalite layer under hydrothermal conditions at 180° C. for 2 hours as set forth in the referenced publication. The sample was washed in hot water for a time sufficient to remove un-reacted synthesis material and then calcined at 500° C. for 6 hours in air. Thereafter, in accordance with this invention, an epitaxial ZSM-5 layer of about 2 microns thick was hydrothermally grown at 180° C. for 3 hours on top of the calcined silicalite layer. See FIG. 9. The figure shows that erosion of the silicalite layer occurred during the growth of the ZSM-5 layer. It is believed that the erosion results from synthesis solution etching. Such etching can be ameliorated or substantially prevented by growing the ZSM-5 layer on a silicalite layer that has been washed but not calcined, as shown in FIG. 10.

What is claimed is:

1. A composition comprising:
a first dense, contiguous, intergrown columnar, polycrystalline molecular sieve layer and a second distinct, dense, contiguous, intergrown, columnar, polycrystalline molecular sieve layer, the second layer having a surface in contact with the first layer, and the first and second layers having pore openings.

2. The composition of claim 1 wherein the first and second layers have a thickness ranging from about 0.1 micrometers to about 100 micrometers and wherein 99% of the crystals in each of the first and second molecular sieve layers has at least one point between adjacent crystals that is less than or equal to 20 Å.

3. The composition of claim 2 wherein the first and second zeolite layers are selected from the group consisting of silicalite, ZSM-5 zeolite, zeolite X, zeolite Y, and mixtures thereof.

4. A composition comprising:
a first dense contiguous, intergrown columnar polycrystalline molecular sieve layer; and a second distinct, dense, contiguous, intergrown, columnar, polycrystalline molecular sieve layer, the second layer having a surface in contact with the first layer, the first and second layers having pore openings; and a support in contact with the first zeolite layer.

5. The composition of claim 1 or 4 wherein the second layer and first layer are epitaxial.

6. The composition of claim 1 or 4, further comprising an intermediate layer situated between the support and the first molecular sieve layer, the intermediate layer comprising nanocrystalline or colloidal-sized molecular sieves having interstices of about 20 to about 2,000 Å.

7. The composition of claim 6 further comprising a mesoporous intermediate layer situated between the first and the second molecular sieve layers, the intermediate layer comprising nanocrystalline or colloidal-sized molecular sieves having interstices of about 20 to about 2,000 Å.

8. The composition of claim 1, 4 or 7 further comprising a selectivity-enhancing coating in contact with the second molecular sieve layer.

* * * * *